United States Patent [19]

Barnett

[11] Patent Number: 4,564,163
[45] Date of Patent: Jan. 14, 1986

[54] RETAINING CLIP

[75] Inventor: Barry R. M. Barnett, Aylesbury, Great Britain

[73] Assignee: TRW United-Carr Limited, Aylesbury, Great Britain

[21] Appl. No.: 616,525

[22] Filed: Jun. 4, 1984

[51] Int. Cl.4 .............................................. B65D 67/02
[52] U.S. Cl. ..................................... 248/71; 248/74.3; 24/297; 24/16 PB
[58] Field of Search .................... 24/297, 293, 16 PB, 24/573, 625, 626, 627; 248/71, 74.3, 74.4; 411/508, 510

[56] References Cited

U.S. PATENT DOCUMENTS

| 2,956,103 | 10/1960 | Steel et al. | 248/74.4 |
| 3,088,702 | 5/1963 | Orenick et al. | 248/71 |
| 3,163,712 | 12/1964 | Cochran | 248/71 |
| 3,515,363 | 6/1970 | Fisher | 248/71 |
| 3,529,795 | 9/1970 | Van Niel | 248/71 |
| 3,913,187 | 10/1975 | Okuda | 248/74.3 |
| 4,122,583 | 10/1978 | Grittner et al. | 24/297 |
| 4,175,728 | 11/1979 | Forguson | 248/71 |
| 4,317,262 | 3/1982 | Wells, Jr. | 24/16 PB |
| 4,371,137 | 2/1983 | Anscher | 24/16 PB |
| 4,457,482 | 7/1984 | Kitagawa | 248/74.3 |

FOREIGN PATENT DOCUMENTS

| 2807119 | 8/1979 | Fed. Rep. of Germany | 248/74.3 |
| 1122363 | 8/1968 | United Kingdom | 24/297 |
| 2040348 | 8/1980 | United Kingdom | 248/74.3 |

Primary Examiner—Victor N. Sakran
Attorney, Agent, or Firm—Daniel G. Blackhurst; Sol L. Goldstein

[57] ABSTRACT

A clip for attaching an elongate element to a support comprising a body portion provided with a fastening member adapted to attach the clip to the support, the body portion providing a seat for the corrugated elongate element and having a flexible arm extending from one side thereof, a free end of the arm being engageable in the other side of the body portion to hold the elongate element in the seat, the body portion comprising one or more fins configured to engage the elongate element to resist longitudinal sliding of the element in the clip.

12 Claims, 8 Drawing Figures

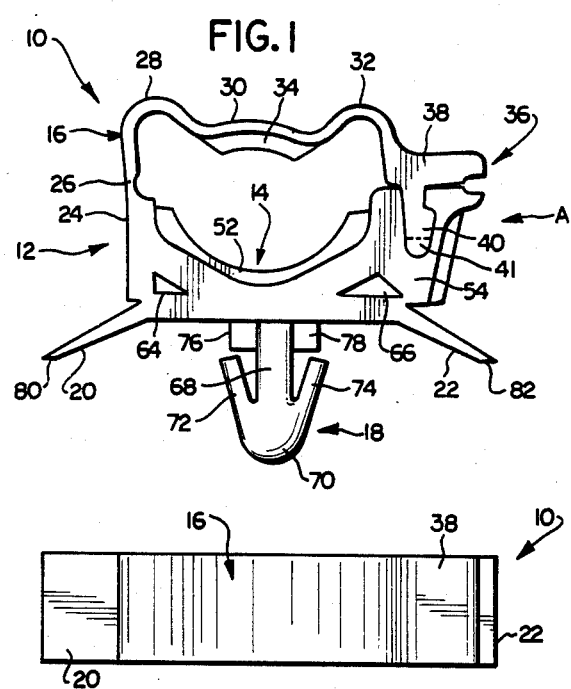
FIG. 1
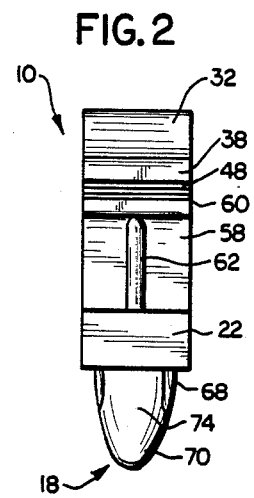
FIG. 2
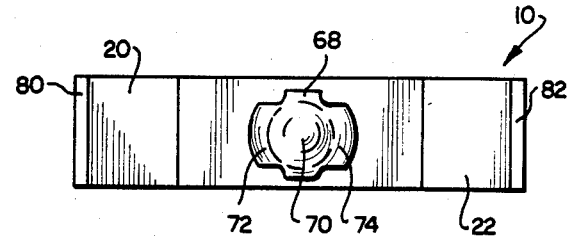
FIG. 3
FIG. 4

RETAINING CLIP

The present invention relates to a clip for retaining elongate elements such as cables, pipes, tubes and the like.

Many types of clips are known for attaching an elongate element to a support. A problem with known clips is that either they are not adapted to resist longitudinal sliding of the element relating to the support or they are configured to provide a close grip on the elongate element so that there is little tolerance in the size of the elongate element which can be accommodated in the clip.

It is an object of the present invention to provide a clip for retaining an elongate element on a support in a secure manner and to resist longitudinal sliding of the element whilst providing a reasonable tolerance in the size of element which can be accommodated in the clip.

According to the present invention a clip for attaching an elongate element to a support comprising a body portion provided with a fastening member adapted to attach the clip to the suppport, the body portion providing a seat for an elongate element having lands and risers circumferentially disposed on its surface such as for example, a corrugated elongate element and having a flexible arm extending from one side thereof, a free end of the arm being engageable in the other side of the body portion to hold the elongate element in the seat, the body portion comprising one or more fins configured to engage the elongate element to resist longitudinal sliding of the element in the clip.

The provision of a fin or fins renders the clip particularly suitable for use in retaining a corrugated elongate element, the fins being engageable between corrugations on the elongate element enabling the element to be held securely against longitudinal sliding whilst using a flexible arm allowing some tolerance in the size of element which can be accommodated in the clip. The clip may also be used with elongate elements having a plain surface, for example a cloth covered cable harness in which case the fin or fins help grip the element to resist longitudinal sliding of the element in the clip.

Preferably, the fins are arcuate and therefore suitable for engagement between annular corrugations.

The body portion may comprise two opposed fins. In a particular embodiment the arm comprises a first fin extending towards the seat and the seat comprises a second fin opposed to and generally aligned with the first fin.

The arm may be sinuously shaped and therefore particularly appropriate for use with elongate elements of circular cross-section. Preferably, the arm has an arched portion which, in use, is disposed substantially centrally of the seat so as to locate an elongate element firmly in the seat.

In a particular embodiment, the arm comprises an arcuate fin extending from the arched portion towards the seat.

A particular embodiment of the present invention will now be described by way of example with reference to the accompanying drawings in which:

FIG. 1 is a front elevation of a clip according to the present invention;

FIG. 2 is a side elevation of FIG. 1 when viewed in direction A;

FIG. 3 is an upper plan view of the clip shown in FIG. 1;

FIG. 4 is a plan view from below the clip shown in FIG. 1;

Figure 5:
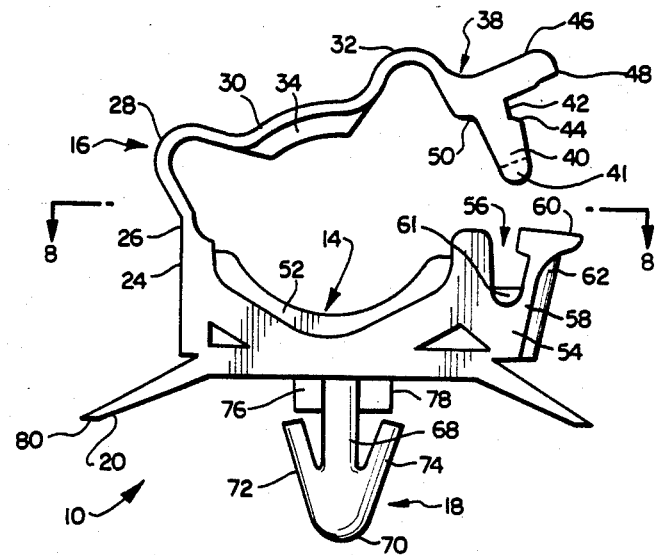
FIG. 5 is a front view of the clip with an end of the arm freed from the body portion.

Referring to the drawings, a one-piece plastics clip is indicated generally at 10 and comprises a body 12 defining a seat portion 14 and having a relatively thin flexible arm 16 extending therefrom. The clip 10 has a fastening element 18 disposed on the underside thereof between two ramps 20 and 22.

The flexible arm 16 extends from one side 24 of the body 12 and is the same width as the body 12. The section 26 interconnecting the body 12 and the flexible arm 16 is thinner than the arm itself to enhance the flexibility of the movement of the arm 16 relative to the body 12.

The arm 16 is sinuously shaped and comprises three arches 28, 30 and 32. The central arch 30 is less pronounced than the arches 28 and 22 and is contiguous with a downwardly depending fin 34 which is disposed centrally of the width of the arm 16 and is of narrow width relative thereto.

The free end 36 of the arm 16 comprises an L-shaped foot 38. One branch 40 of the foot 38 has a neck portion 42 defining a shoulder 44. The underside of the other branch 46 of the foot 38 has a small recess 48 formed therein. The branch 40 comprises a generally square notch 41 (shown dotted in FIGS. 1, 5 and 6) extending therethrough and disposed centrally of its width. The notch 41 extends across approximately one-fifth of the width of the branch 40. The foot 38 comprises a second shoulder 50 adjacent the junction of the branches 38 and 40.

Figure 8:
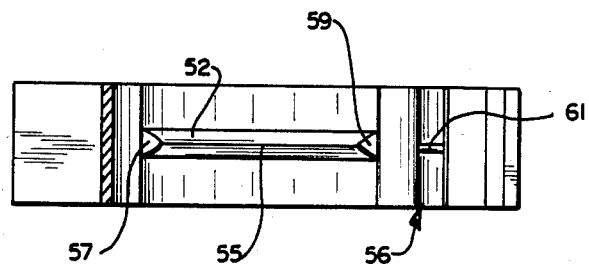
FIG. 8 is a cross-section on the line VIII—VIII of FIG. 5.

The seat portion 14 is substantially arcuate and comprises a fin 52 which extends upwardly and in the same plane as the fin 34. FIG. 1 illustrates that the fin 34 is positioned substantially centrally of the seat 14. Referring to FIG. 8, the fin 52 tapers upwardly to form an edge 55 which terminates at each end in two generally flat triangular portions 57 and 59.

Adjacent the seat portion 14, the body 12 comprises a substantially U-shaped portion 54 having a recess 56 shaped complementarily with respect to the branch 40 of the foot 38. The outermost limb 58 of the U-shaped portion 54 has a small recess 60 at its uppermost end and is provided with a strengthening rib 62.

The base of the recess 56 is provided wtih a rib 61 disposed centrally of the width of the recess and adapted to locate in the notch 41 in the branch 40 of the arm 16 so as to limit transverse movement of the foot 38 of the arm 16 relative to the U-shaped portion 54 of the body 12 when it is engaged in the U-shaped portion 54.

In this embodiment, the rib 61 is about half the width of the notch 41, but may be made wider if desired as long as it can locate in the notch 41.

Figure 6:
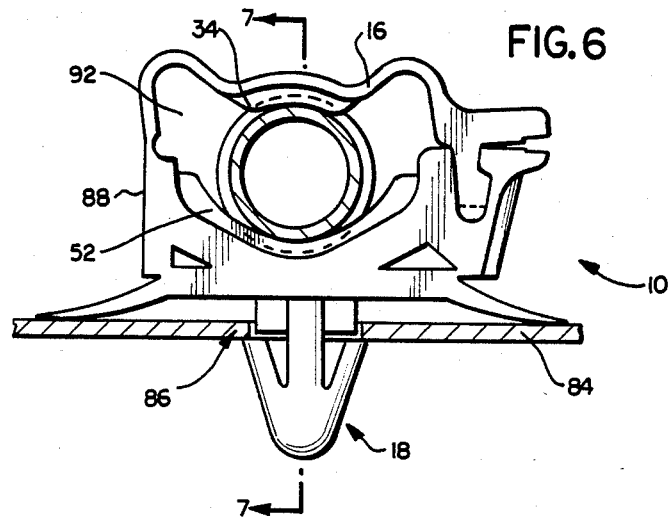
FIG. 6 is a front view of the clip fastened to a support and retaining an elongate element.

The two triangular recesses 64, 66 shown in FIGS. 1, 5 and 6 are connected with the molding process and have no structural significance.

The fastening member 18 comprises a shank 68 contiguous with a nose 70. Two resilient legs 72 and 74 extend upwardly towards the body 12. The width of the legs 72 and 74 is slightly less than the width of the shank 68 (as can be seen from FIG. 2). At the end of the shank 68 adjacent the body 12 are two substantially cubic locating and strengthening blocks 76 and 78. The ramps 20 and 22 extend downwardly to a level approximately equal to that of the free ends of the legs 72 nd 74. The ramps 20 and 22 each comprise a bevelled portion 80, 82 at their free ends.

Figure 7:
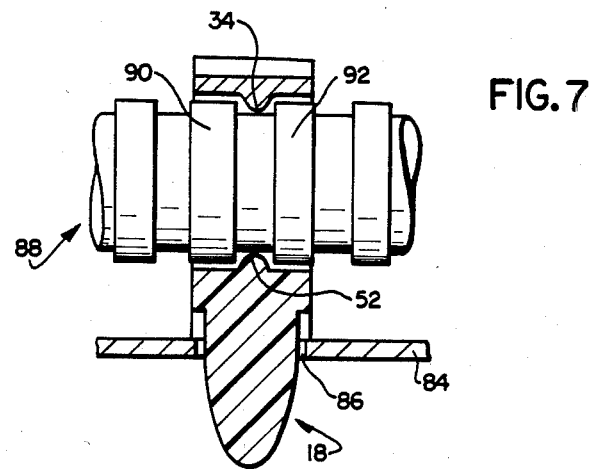
FIG. 7 is a side view in cross-section along line VII—VII of FIG. 6.

A particular use of the clip 10 will be described with reference to FIGS. 5, 6 and 7. The bulk of the reference numerals have been omitted from FIG. 6 for clarity.

The clip 10 is fastened to an apertured support 84 by pressing the nose 70 of the fastening member 18 into the aperture 86. This causes the legs 72 and 74 to flex inwardly towards the shank 68 to allow the fastening member 18 to be inserted through the aperture 86. The blocks 76 and 78 restrict sideways movement of the clip 10 in the aperture 86. The bevelled edges 80 and 82 on the ramps 20 and 22 abut the upper surface of the support 84 and the ramps 20 and 22 are caused to be slightly flattened due to the thickness of the panel 84.

The foot 38 of the flexible arm 16 is dislodged from the U-shaped portion 54 of the body 12 by inserting the end of a screwdriver into the groove formed by the recesses 48 and 60 and twisting the screwdriver. The difference in the widths of the notch 41 on the foot 38 and the rib 61 in the recess 56 allows slight transverse movement of the foot 38 relative to the U-shaped portion 54 to facilitate dislodgement of the foot 38 from the U-shaped portion 54 using a screwdriver.

A corrugated tube 88 is placed in the seat portion 14 and positioned so that the fins 34 and 52 locate between a pair of corrugations 90 and 92 of the corrugated tube 88. The tube 88 is then held in the clip 10 by snap-engaging the foot 38 in the U-shaped portion 54. The corrugated tube 88 is held securely against longitudinal sliding movement in the clip 10 by the fins 34 and 52.

The engagement of the rib 61 in the notch 41 limits transverse movement of the foot 38 in the U-shaped portion 54.

In general, the flexible arm may be configured to co-operate with whatever shape of elongate element it is desired to retain. The position and shape of the fins may be adapted according to the particular type of elongate element to be retained. For example, three circumferentially spaced fins may be provided on the flexible arm and/or seat of the clip rather than an opposed pair of fins. Furthermore, it is envisaged to provide a plurality of fins in the clip which are spaced longitudinally with reference to the length of the elongate element to be retained and these may be configured for engagement between different pairs of corrugations in the case of a corrugated elongate element.

The arm may be adapted to retain more than one elongate element in the clip, in particular to retain two elongate elements side by side, and the shape and disposition of the fins would be adapted accordingly. Furthermore, a clip according to the present invention may comprise a plurality of flexible retaining arms.

Any suitable means may be used for interconnecting a free end of the arm with the body portion of the clip and these need not necessarily snap-engage together.

Various forms of fastening member may be used for securing the clip to a support and the particular one employed will depend on the intended use of the clip.

The ramps of the particular embodiment described may be replaced by a resilient circular skirt configured so as, in use, to abut the support.

Having thus described my invention, I claim:

1. A clip for attaching an elongate element having a series of lands and risers circumferentially disposed on its surface to a support comprising a body portion provided with a fastening member adapted to attach the clip to the support, the body portion including means defining a seat for the elongate element and having a flexible arm extending from one side thereof, a free end of the arm being engageable in the other side of the body portion to hold the elongate element in the seat, the body portion comprising at least one fin configured to engage said lands on the elongate element to resist longitudinal sliding of the element in the clip.

2. A clip as defined in claim 1 wherein the fin is arcuate.

3. A clip as defined in claim 1 wherein the body portion includes two opposed fins.

4. A clip as defined in claim 1 wherein the arm comprises a first fin extending towards the seat and the seat comprises a second fin opposed to and generally aligned with the first fin.

5. A clip as defined in claim 1 wherein the arm is sinuously shaped.

6. A clip as defined in claim 5 wherein the arm has an arched portion which, in use, is disposed.

7. A clip as defined in claim 6 wherein the arm comprises an arcuate fin extending from the arched portion towards the seat.

8. A clip as defined in claim 1 equipped with fastening means including means for restricting the sideways movement of said clip and wherein the free end of the arm comprises a tongue configured for snap-engagement in a recess in the body portion.

9. A clip as defined in claim 8 wherein the tongue and the recess are each provided with retaining means which interengage one another when the tongue is in the recess to limit transverse movement of the tongue in the recess.

10. A clip as defined in claim 8 comprising at least two resilient ramp elements disposed around the fastening element configured so as, in use, to abut the support.

11. A clip as defined in claim 8 comprising a resilient circular skirt configured so as, in use, to abut the support.

12. A clip as claimed in claim 8 which is of one-piece and made of a plastic material.

* * * * *